(12) United States Patent
Monarco

(10) Patent No.: US 9,884,636 B1
(45) Date of Patent: Feb. 6, 2018

(54) COLLAPSIBLE PUSH CAR

(71) Applicant: Melanie Anne Monarco, Lakewood, CO (US)

(72) Inventor: Melanie Anne Monarco, Lakewood, CO (US)

( * ) Notice: Subject to any disclaimer, the term of this patent is extended or adjusted under 35 U.S.C. 154(b) by 0 days.

(21) Appl. No.: 15/671,309

(22) Filed: Aug. 8, 2017

(51) Int. Cl.
*B62B 1/12* (2006.01)
*B62B 5/06* (2006.01)
*B62B 7/10* (2006.01)
*A61G 5/08* (2006.01)

(52) U.S. Cl.
CPC .............. *B62B 1/12* (2013.01); *B62B 5/06* (2013.01); *B62B 7/10* (2013.01); *A61G 5/08* (2013.01)

(58) Field of Classification Search
CPC .. B62D 39/00; B62B 7/10; B62B 7/08; B62B 7/12; B62B 11/00; B62H 7/07
See application file for complete search history.

(56) References Cited

U.S. PATENT DOCUMENTS

| | | | |
|---|---|---|---|
| 5,645,290 A * | 7/1997 | Gaffney | B62B 3/16 280/33.998 |
| 5,692,760 A * | 12/1997 | Pickering | B62B 7/12 280/1.188 |
| 5,884,922 A * | 3/1999 | Pickering | B62B 7/12 280/1.188 |
| 6,231,056 B1 * | 5/2001 | Wu | A47D 1/02 280/1.188 |
| 6,536,786 B1 * | 3/2003 | Katoozian | B62B 3/144 280/33.991 |
| 7,007,975 B2 * | 3/2006 | Taylor | B62K 9/00 180/208 |
| 7,025,364 B1 * | 4/2006 | Clarke | A47D 13/04 280/47.38 |
| 7,832,757 B2 * | 11/2010 | McCabe | B62B 9/00 280/650 |

* cited by examiner

*Primary Examiner* — John D Walters
*Assistant Examiner* — James J Triggs
(74) *Attorney, Agent, or Firm* — Plager Schack LLP

(57) ABSTRACT

A collapsible push car for holding at least one rider includes a front chassis body attached to a rear chassis body; a front panel strip attached to a front edge of the front chassis body distal from the rear chassis body; a pair of foldable front quarter panels hingeably attached to the front chassis body; a pair of foldable rear quarter panels hingeably attached to the rear chassis body; a rear panel strip attached to a back edge of the rear chassis body; a seat positioned on the rear chassis body; a pair of front wheels attached to the front chassis body; a pair of back wheels attached to the rear chassis body; and a handle assembly attached to the rear chassis body. The front wheels are spaced apart by a different width than the back wheels to allow for folding of the push car.

13 Claims, 4 Drawing Sheets

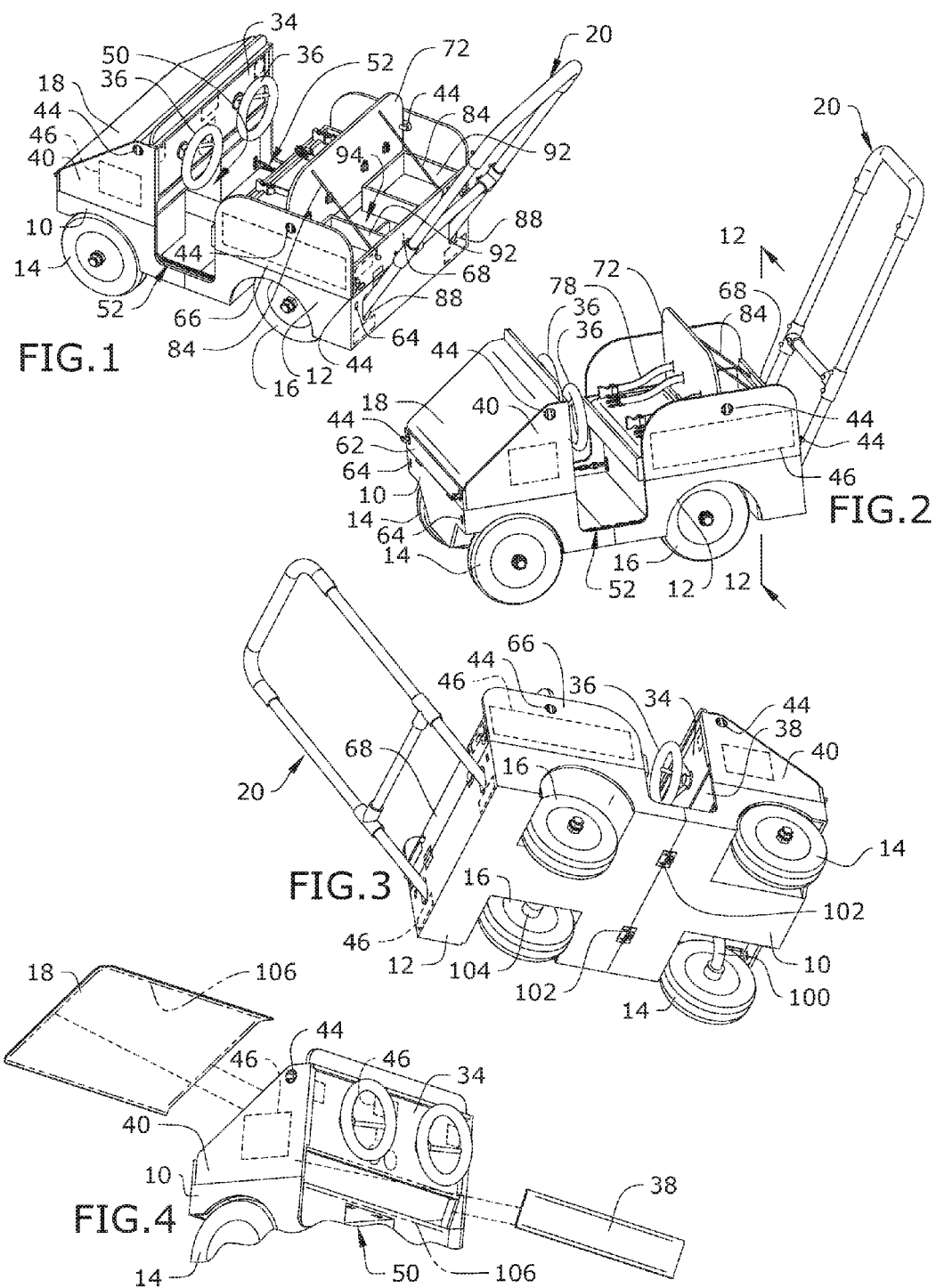

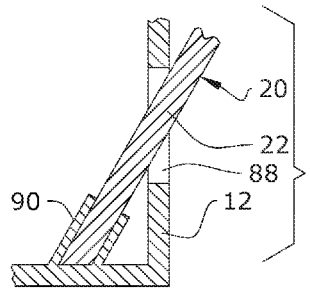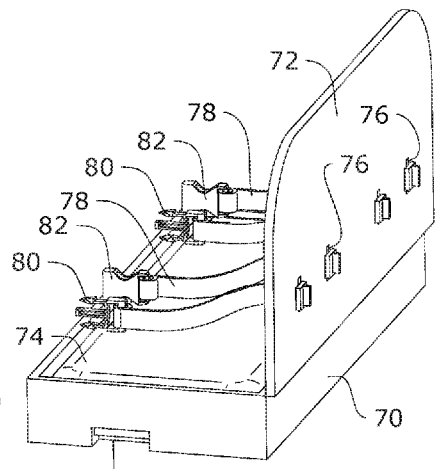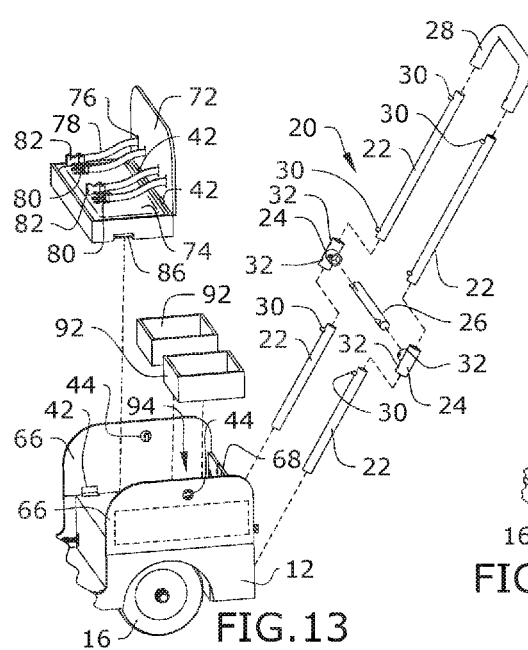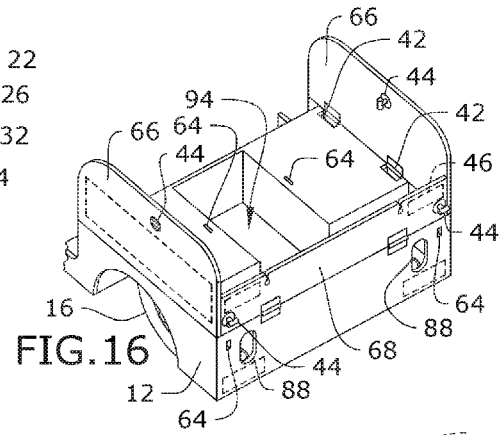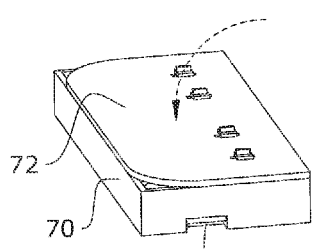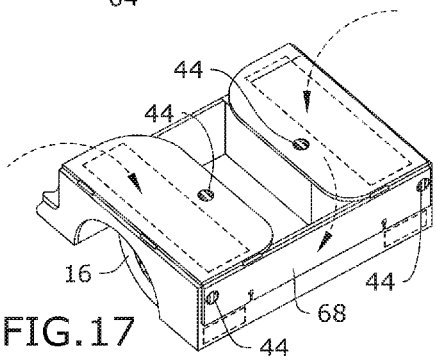

COLLAPSIBLE PUSH CAR

BACKGROUND

The embodiments herein relate generally to transportation devices, and more particularly, to a collapsible push car designed to carry, for example, at least one child.

When adults travel with children, they are often left carrying the child and the child's belongings. As such, adults are left with the problem of either hauling a bulky travel system to avoid having to carry the child or figure out how to carry the child and everything else.

Conventional travel systems exist, however each tends to come with additional constraints. For example, an adult may be left having to choose between portability or other features like storage and stimulus for the child. Moreover, some travel solutions are not suitable to use, as they require the adult to pull in a non-ergonomic position.

Additionally, some transport systems, such as a large wagon, may work to hold multiple children and their belongings, but many wagons are not collapsible and, thus, cannot be packed into a car for transport.

Therefore, what is needed is an ultra-portable travel system that provides room for at least one child, stimulus for the child, and storage for belongings, all while being used in an ergonomic position by the adult. Moreover, the system needs to be collapsible for transport purposes.

SUMMARY

Some embodiments of the present disclosure include a collapsible push car for holding at least one rider. The collapsible push car may comprise a front chassis body attached to a rear chassis body; a front panel strip attached to a front edge of the front chassis body distal from the rear chassis body; a pair of foldable front quarter panels hingeably attached to the front chassis body; a pair of foldable rear quarter panels hingeably attached to the rear chassis body; a rear panel strip attached to a back edge of the rear chassis body; a seat positioned on the rear chassis body; a pair of front wheels attached to the front chassis body; a pair of back wheels attached to the rear chassis body; and a handle assembly attached to the rear chassis body. The front wheels are spaced apart by a different width than the back wheels to allow for folding of the push car.

BRIEF DESCRIPTION OF THE FIGURES

The detailed description of some embodiments of the invention is made below with reference to the accompanying figures, wherein like numerals represent corresponding parts of the figures.

FIG. 1 is a top rear perspective view of one embodiment of the present disclosure.

FIG. 2 is a top front perspective view of one embodiment of the present disclosure.

FIG. 3 is a bottom rear perspective view of one embodiment of the present disclosure.

FIG. 4 is an exploded detail view of one embodiment of the present disclosure.

FIG. 12 is a section detail view of one embodiment of the present disclosure, taken along line 12-12 in FIG. 2.

FIG. 13 is an exploded detail view of one embodiment of the present disclosure.

FIG. 14 is a perspective view of one embodiment of the present disclosure.

FIG. 15 is a perspective detail view of one embodiment of the present disclosure.

FIG. 16 is a perspective detail view of one embodiment of the present disclosure.

FIG. 17 is a perspective detail view of one embodiment of the present disclosure.

DETAILED DESCRIPTION OF CERTAIN EMBODIMENTS

Figure 5:
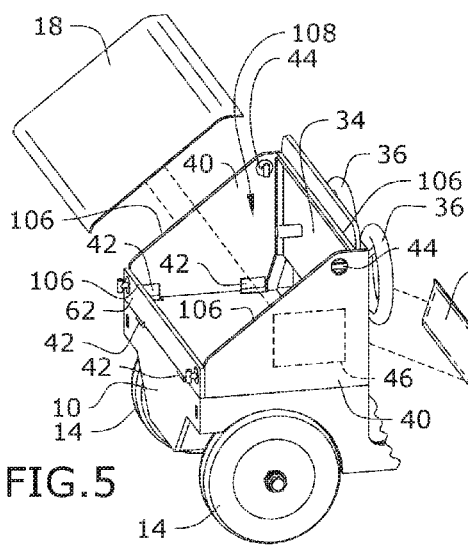
FIG. 5 is an exploded detail view of one embodiment of the present disclosure.
Figure 6:
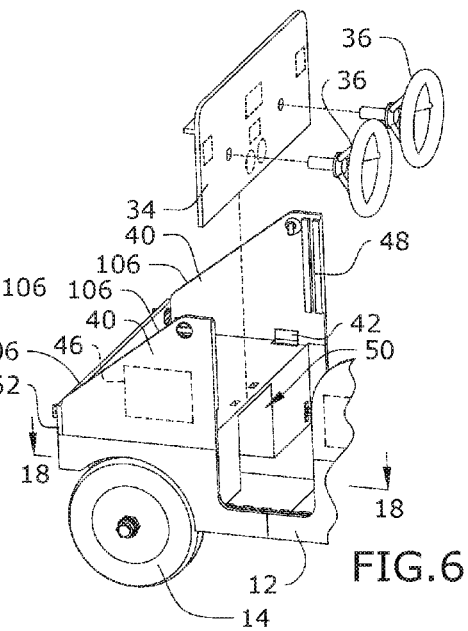
FIG. 6 is an exploded detail view of one embodiment of the present disclosure.
Figure 7:
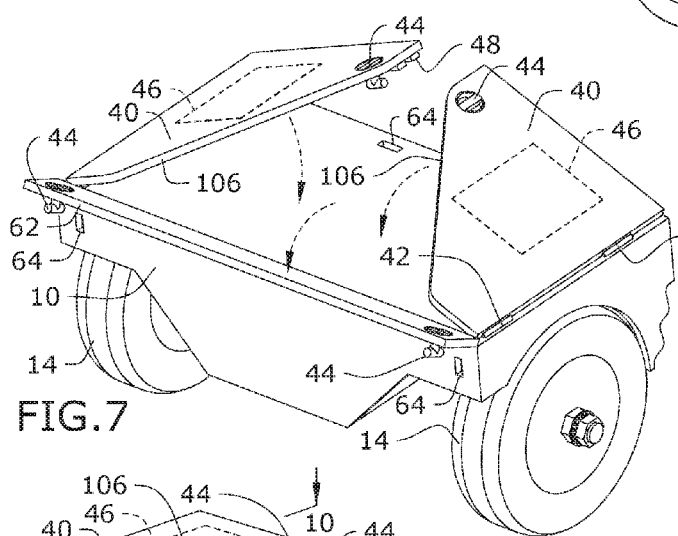
FIG. 7 is a perspective detail view of one embodiment of the present disclosure.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a push car to transport at least one person and personal belongings and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

a. Front Chassis Body
   b. Rear Chassis Body
   c. Foldable Quarter Panels
   d. Seat
   e. Handle The various elements of the device of the present disclosure may be related in the following exemplary fashion. It is not intended to limit the scope or nature of the relationships between the various elements and the following examples are presented as illustrative examples only.

By way of example, and referring to FIGS. 1-22, some embodiments of the present disclosure include a collapsible push car for holding at least one person and, optionally, personal belongings, the push car comprising a front chassis body 10 attached, such as hingeably attached, to a rear chassis body 12, wherein the front chassis body 10 may have a different shape than the rear chassis body 12; a front panel strip 62 attached to an edge of the front chassis body 10 distal from the rear chassis body 12; a pair of foldable front quarter panels 40 hingeably attached to the front chassis body 10; a pair of foldable rear quarter panels 66 hingeably attached to the rear chassis body 12; a rear panel strip 68 attached to an edge of the rear chassis body 12 distal from the front chassis body 10; a seat attached to the rear chassis body 12; a handle assembly 20 removably attached to the rear chassis body 12; a pair of front wheels 14 attached to the front chassis body 10; and a pair of back wheels 16 attached to the rear chassis body 12, wherein the front wheels 14 are spaced apart by a first width, the back wheels 16 are spaced apart by a second width, the first width and the second width are not the same to allow for folding of the push car.

Figure 21:
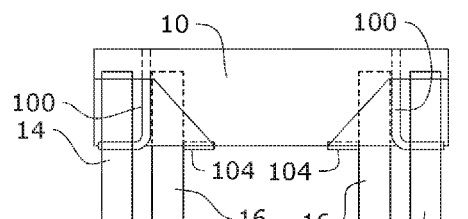
FIG. 21 is a front view of one embodiment of the present disclosure.

As shown in the Figures, the front chassis body 10 may extend from a front edge to an edge adjacent to the rear chassis body 12. The portion of the front chassis body 10 immediately adjacent to the rear chassis body may comprise a lowered foot region. A central portion of the lowered foot region may extend completely to the front edge. However, the forward portion of the sides of the lowered foot region may extend upwards to a forward plateau, wherein the raised sides may define front wheel wells sized to accommodate the front wheels 14. The space between the front wheel wells may define a lower front storage area 50. The front wheels 14 may each rotatably attach to the front chassis body 10 via a front axle 100. Each front axle 100 may be substantially L-shaped, as shown in FIG. 21 to allow for the folding together of the front chassis body 10 and the rear chassis body 12.

Figure 8:
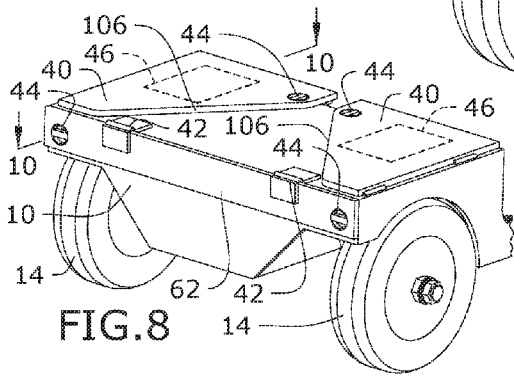
FIG. 8 is a perspective detail view of one embodiment of the present disclosure.

As shown in the Figures, a flat panel may cover both front wheel wells and the lower front storage area 50. The front quarter panels 40 may each attach to an outer side edge of the flat panel via hinges 42. When in their unfolded state, the front quarter panels 40 may extend substantially perpendicularly upwards from the outer edge of the side of the flat panel/front chassis body 10. As to their length, the front quarter panels 40 may each extend from a front edge of the front chassis body 10 to an edge of the front wheel wells proximate to the rear chassis body 12. Each of the front quarter panels 40 may include a lock tab, such as a rotating lock tab 44, built therein, such that when the front quarter panels 40 are folded down, the rotating lock tab 44 may engage with a lock slot 64 in the forward plateau of the front chassis body 10. As such, the rotating lock tabs 44 on the front quarter panels 40 may be used to lock the front quarter panels 40 in a folded position, as shown in FIG. 8. An upper edge of each front quarter panel 40 may include a fastener designed to engage with a front cover 18, as explained in more detail below.

An edge of each of the front quarter panels 40 distal from the front end of the front chassis body 10 may include a front channel 48 attached to an inner surface thereof. Outer edges of a steering wheel plate 34 may be designed to slide into the front channels 48. At least one steering wheel 36 may be rotatably mounted to the steering wheel plate 34, such that the steering wheel 36 extends toward the rear chassis body 12. In embodiments, the front channels 48 may be positioned such that when the front quarter panels 40 are folded down, the channels 48 are spaced from the top of the wheel wells, allowing the front quarter panels 40 to lay flat and flush against the wheel wells.

A front panel strip 62 may be hingeably attached to the front edge of the front chassis body 10 by hinges 42. When in an unfolded state, the front panel strip 62 may extend substantially perpendicularly upwards from the front edge of the front chassis body 10. An edge of the front panel strip 62 distal from the hinges 42 may include a fastener designed to engage with a front cover 18, as explained in more detail below. The front panel strip 62 may have at least one lock tab, such as a rotating lock tab 44, built therein, such that when the front panel strip 62 is folded down, the rotating lock tab 44 is positioned to engage with a lock slot 64 extending through a front wall of the front chassis body 10. As such, the front panel strip 62 may be locked into its folded down position, as shown in FIG. 8.

An area defined by the front chassis body 10, the front quarter panels 40, the front panel strip 62, and the steering wheel plate 34 may be a upper front storage region 108. The upper front storage region 108 may be covered or closed by attaching a front cover 18 to upper edges of the front quarter panels 40, the front panel strip 62, and the steering wheel plate 34. While any suitable fasteners may be used to removably attach the front cover 18 to the upper edges of the front quarter panels 40, the front panel strip 62, and the steering wheel plate 34, in some embodiments, the fastener comprises a hook and loop fastener 106.

As shown in FIG. 5, a steering column fabric 38 may be attached to a surface of the steering wheel plate 34 facing the rear chassis body 12. Similar to the front cover 18, the steering column fabric 38 may be attached to a surface of the steering wheel plate 34 using, for example, a hook and loop fastener. In embodiments, the hook and loop fastener 106 may be positioned such that a rider in the push car cannot easily access the hook and loop fastener 106. Thus, the positioning of the fastener may prevent a child from trying to play with the fastener or detach the pieces.

As shown in the Figures, the rear chassis body 12 may have a lowered foot region proximate to the front chassis body 10. The rear chassis body 12 may then extend upwards from the lowered foot region to a substantially flat seat region and back downward to a lowered plateau. The substantially flat seat region may define an upper surface of the rear wheel well. In embodiments, only the rear wheel wells may be covered by the flat seat region and a space between the wheel wells may be left open. Leaving the central portion open may (1) reduce the overall weight of the push car; (2) allow for easier access to the rear storage area; and (3) allow easier attachment of the seat base to the wheel wells. In embodiments, a bottom side of the rear chassis body 12 may include a U-shaped cut out defining the rear wheel well. Each of the rear wheels 16 may be rotatably attached to the rear chassis body 12 via a rear axle 104. In embodiments, the rear axle 104 may be substantially planar and extend perpendicularly from the rear wheel 16 to the rear chassis body 12. The lowered plateau of the rear chassis body 12 may include a pair of angled handle receivers 90 sized to accommodate the handle assembly 20, as shown in FIG. 12. A rear wall of the rear chassis body 12 may include a pair of handle slots 88 extending therethrough, such that the handle assembly 20 may extend from an area outside of the rear chassis body 12, through the handle slots 88, and into the angled handle receivers 90. The lowered plateau, along with the rear chassis body 12 side walls and rear wall may also define a rear storage area 94. In some embodiments, the rear storage area 94 may be sized to accommodate at least one storage tote 92.

The rear quarter panels 66 may be hingeably attached to the rear chassis body 12 by hinges 42. When in their unfolded state, the rear quarter panels 66 may extend substantially perpendicularly upwards from an outer edge of the side of the rear chassis body 12. As to their length, the rear quarter panels 66 may extend from a forward edge of the seat region to the back edge of the rear chassis body 12. Each of the rear quarter panels 66 may include a lock tab, such as a rotating lock tab 44, built therein, such that when the rear quarter panels 66 are folded down, the rotating lock tab 44 engages with a lock slot 64 in the seat region of the rear chassis body 12. As such, the rotating lock tabs 44 on the rear quarter panels 66 may be used to lock the rear quarter panels 66 in a folded position, as shown in FIG. 17.

The rear panel strip 68 may be hingeably attached to the back edge of the rear chassis body 12 by hinges 42, when in an unfolded state, may extend substantially perpendicularly upwards from the back edge of the rear chassis body 12. An edge of the rear panel strip 68 distal from the hinges 42 may include slots configured to engage with seat tethers 84 as shown in FIG. 1 and as explained in more detail below. The rear panel strip 68 may have at least one lock tab, such as a rotating lock tab 44, built therein, such that when the rear panel strip 68 is folded down, the rotating lock tab 44 is positioned to engage with a lock slot 64 extending through the rear wall of the rear chassis body 12. As such, the rear panel strip 68 may be locked into its folded down position, as shown in FIG. 17.

Figure 9:
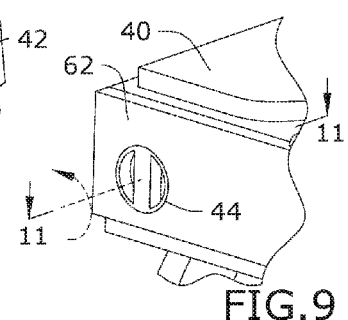
FIG. 9 is a perspective detail view of one embodiment of the present disclosure.
Figures 10, 11:
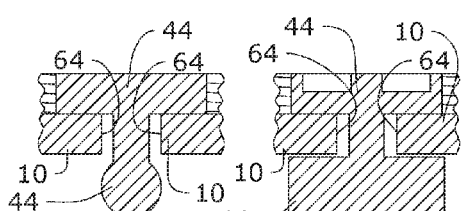
FIG. 10 is a section detail view of one embodiment of the present disclosure, taken along line 10-10 in FIG. 8.
FIG. 11 is a section detail view of one embodiment of the present disclosure, taken along line 11-11 in FIG. 9.

As described above, the various foldable panels may be locked into place via lock tabs engaging with lock slots 64. As also mentioned above, the lock tabs may comprise rotating lock tabs 44. As shown in FIGS. 10 and 11, the rotating lock tabs 44 may have an elongate end designed to extend through the lock slot 64. When the lock tab 44 is rotated, the elongate end prevents the rotating lock tab 44 from slipping back through the lock slot 64 due to the shape of the elongate end 44. In other words, the lock slots 64 may also be elongate, such that when the rotating lock tab 44 is rotated, the elongate end no longer aligns with and cannot pass through the lock slot 64, as shown in FIG. 11. A surface of the rotating lock tab 44 opposite the elongate end may comprise a flattened handle, such that a user may rotate the rotating lock tab 44. In some embodiments, the flattened handle may comprise a substantially circular panel with indents sized to accommodate a user's fingers, as shown in FIG. 9. While an exemplary lock tabs are described above and shown in the drawings, the use of other locking mechanisms are also envisioned.

Figure 19:
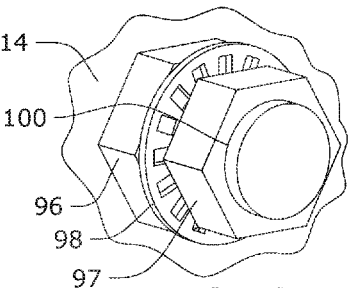
FIG. 19 is a perspective view of one embodiment of the present disclosure.
Figure 20:
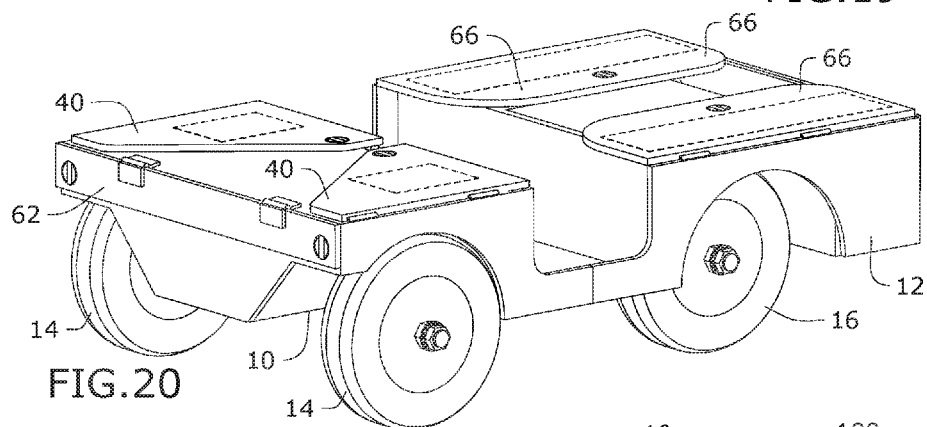
FIG. 20 is a perspective view of one embodiment of the present disclosure.

As shown in FIG. 19, the wheels 14, 16 may be attached to their respective chassis body 10, 12 via an axle 100, 104. In either case, an end of the axle 100, 104 distal from the chassis body 10, 12 may extend through a central orifice in the wheel 14, 16. The wheel 14, 16 may be secured to the axle 100, 104 via an inner nut 96 positioned adjacent to the wheel 14, 16, a lock washer 98 positioned adjacent to the inner nut 96, and an outer nut 97 positioned adjacent to the lock washer 98, such that the lock washer 98 is sandwiched between the inner nut 96 and the outer nut 97. In other embodiments, the ends of the axle 100, 104 distal from the chassis body 10, 12 may simply be covered by an axle cap (not shown) to secure the wheels 14, 16 onto their respective axles 100, 104.

In embodiments, the seat may comprise a seat box body 70 attached to the rear chassis body 12 and a seat back 72 attached, such as hingeably attached, to a rear edge of the seat box body 70. Some embodiments may include a seat back 72 that is locked into place on the chassis body 12. Moreover, in some versions, the seat may be incorporated into the rear chassis body 12, such that it is not a removable component. The seat may further comprise at least one seatbelt 78 extending from the seat back 72, wherein the seatbelt 78 is sized to encircle the torso of a person, such as a child. For example, and as shown in FIG. 14, the seat back 72 may include at least one pair of seatbelt slots 76, wherein a first half of the seatbelt 78 extends from a first seatbelt slot 76 and a second half of the seatbelt 78 extends from a second seatbelt slot 76. An end of the first half of the seatbelt 78 distal from the seat back 72 may comprise a clip, such as a female clip 82, and an end of the second half of the seatbelt 78 distal from the seat back 72 may comprise a clip, such as a male clip 80, designed to engage with the clip on the first half of the seatbelt 78. Thus, the seatbelt 78 may releasably attach around a user to help secure the user within the push car. Of course, depending on the size of the push car and the number of desired occupants, more seatbelts 78 may be attached to the seat back 72. As shown in the figures, a cushion 74 may be placed on or secured to a top surface of the seat box body 70 for comfort purposes. As shown in FIG. 15, the seat back 72 may be hingeably attached to the seat box body 70, such that the seat back 72 folds down and functions as a lid. Moreover, as shown in FIGS. 1 and 2, the seat back 72 may be releasably attached to the rear panel strip 68 by at least one seat tether 84, wherein the seat tether 84 may prevent the seat back 72 from inadvertently folding forward. As shown in FIG. 13, because the seat box body 70 may sit on top of the rear chassis body 12 where hinges 42 are present, the bottom edge of the seat box body 70 may include hinge slots 86 sized to accommodate the hinges 42 to allow the seat box body 70 to lay flat against the rear chassis body 12 during use.

The handle assembly 20 may attach, such as removably attach, to the rear chassis body 12 as explained briefly above and as shown in FIGS. 1-3, 12, and 13. While any suitable handle assembly 20 may work, some embodiments of the handle assembly 20 comprise a first pair of straight shafts 22 having a first end and a second end, wherein the first end is designed to engage with the handle receivers 90. A second pair of straight shafts 22 are designed to removably attach to the first pair of straight shafts 22 via handle T-fittings 24. The handle T-fittings 24 may be attached to one another by a cross bar 26. A distal end of each of the second pair of straight shafts may be attached to a handle U-bar 28. Each of the straight shafts 22 may include a push button 30 extending outwardly therefrom, wherein the push button 30 is designed to engage with a button orifice 32 in the T-fittings 24. Similarly, the distal end of each of the second pair of straight shafts may also include a push button 30 designed to engage with button orifices 32 in the handle U-bar 28.

As mentioned above, the front chassis body 10 may be attached to the rear chassis body 12. In some embodiments, the front chassis body 10 may be rigidly attached to the rear chassis body 12. In other embodiments, the front chassis body 10 may be hingeably attached to the rear chassis body 12, such that the rear chassis body 12 is designed to fold on top of the front chassis body 10. In such cases, the hinge attaching the front chassis body 10 and the rear chassis body 12 may be at least one locking hinge 102 attached to a bottom surface of each of the front chassis body 10 and the rear chassis body 12.

The elements of the push car of the present disclosure may be made of any suitable or desired materials. For example, in some embodiments, the front chassis body 10, the rear chassis body 12, the various folding panels, and the like, may all comprise wood, plastic, or any other conventional building material. In some embodiments, the front cover 18 and steering column cover 38 may comprise a rigid material or a non-rigid material, such as a fabric.

The various folding panels may change in shape such that the overall appearance of the push car resembles a different type of vehicle or object. For example, as shown in the Figures, the panels may be shaped to resemble a car. However, in other embodiments, the panels may be shaped to resemble other vehicles, such as a boat, plane, or the like. Moreover, additional decorative features, such as decals 46, may be strategically added to the push car, causing it to more closely resemble the desired vehicle. In fact, while not shown in the Figures, the steering wheel plate 34 and front cover 18 may be removed, allowing the front wheel wells to function as additional seats, thus causing the push car to resemble more of a standard wagon. Another option for adding additional seats to the push car is to leave rear panel strip 68 folded down and attaching an additional seat box to the rear chassis body 12. This seating area may not include a secure foot area, but may still contain all of the other safety attachments, including seatbelts 78 and the like.

Additionally, the push car of the present disclosure may come in various sizes to accommodate various numbers of riders. For example, as shown in the Figures, the push car may accommodate two riders and, thus, may include two seatbelts 78 and two steering wheels 36. However, additional seatbelts 78 and steering wheels 36 may be added and the push car may be increased in size to accommodate additional riders. Alternatively, the push car may be downsized to accommodate a sole rider.

Figure 18:
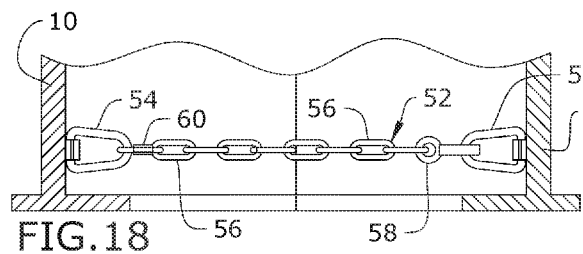
FIG. 18 is a section detail view of one embodiment of the present disclosure, taken along line 18-18 in FIG. 6.

To use the push car of the current disclosure as a push car, a user may unfold the rear chassis body 12 from the front chassis body 10, wherein the locking hinges 102 may prevent the chassis 10, 12 from inadvertently folding during use. The different quarter panels may be unfolded, the steering wheel plate 34 may be inserted, and the seat box body 70 may be placed. The handle assembly 20 may be assembled and inserted into the handle receivers 90. A rider may enter the push car and sit on the seat box body 70. In some embodiments, a safety chain assembly 52 may extend from the front chassis body 10 to the rear chassis body 12 as shown in FIGS. 1, 2, and 18. The chain assembly 52 may comprise a chain ring 54 attached to the front chassis body 10 and a second chain ring 54 attached to the rear chassis body 12, wherein a plurality of chain links 56 attach the two chain rings 54. At least one of the chain links 56 may comprise an adjustment link 60, and at least one end of the chain links 56 may attach to the chain ring 54 via a clip 58. A user may then push a rider in the push car using the handle assembly 20.

Figure 22:
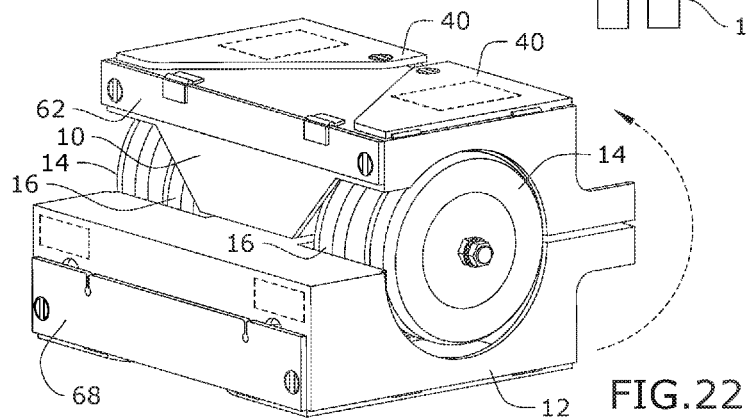
FIG. 22 is a perspective view of one embodiment of the present disclosure.

To store or transport the push car, the handle assembly 20 may be removed and, if desired, disassembled. The seat box body 70 may be removed and the seat back 72 may be folded down. Each of the quarter panels may be folded down and locked into place using the lock tab. Similarly the rear panel strip and the front panel strip and be folded down and locked into place. The locking hinges 102 may be unlocked and the chain assembly 52 may be unfastened, such that the front chassis body 10 may fold on top of the rear chassis body 12, as shown in FIG. 22. Because of the offset front wheels 14 and rear wheels 16, the front chassis body 10 may lay flat on the rear chassis body 12, as shown in FIGS. 21 and 22.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A collapsible push car for holding at least one rider, the push car comprising:
   a front chassis body attached to a rear chassis body;
   a front panel strip attached to an edge of the front chassis body distal from the rear chassis body;
   a pair of foldable front quarter panels hingeably attached to the front chassis body;
   a pair of foldable rear quarter panels hingeably attached to the rear chassis body;
   a rear panel strip attached to an edge of the rear chassis body distal from the front chassis body;
   a seat positioned on the rear chassis body;
   a pair of front wheels attached to the front chassis body;
   a pair of back wheels attached to the rear chassis body; and
   a handle assembly attached to the rear chassis body,
   wherein
      the front wheels are spaced apart by a first width;
      the back wheels are spaced apart by a second width, and
      the first width and the second width are not the same.

2. The collapsible push car of claim 1, wherein the front chassis body is attached to the rear chassis body by at least one locking hinge.

3. The collapsible push car of claim 1, wherein the front chassis body has a different shape than the rear chassis body.

4. The collapsible push car of claim 1, wherein:
   the rear chassis body comprises at least one handle receiver; and
   the handle assembly is removably engaged with the at least one handle receiver, causing the handle assembly to be removably attached to the rear chassis body.

5. The collapsible push car of claim 4, wherein the handle assembly comprises:
   a pair of straight shafts, wherein each of the pair of straight shafts is sized to engage with a respective handle receiver; and
   a handle U-bar is attached to an end of each of the straight shafts distal from the handle receiver.

6. The collapsible push car of claim 5, wherein each of the pair of straight shafts comprises a plurality of smaller shafts removably attached to one another.

7. The collapsible push car of claim 1, further comprising:
   a steering wheel plate designed to removably engage with the pair of front quarter panels; and
   at least one steering wheel extending from the steering wheel plate toward the rear chassis body.

8. The collapsible push car of claim 1, wherein the seat comprises:
   a seat box body;
   a seat back hingeably attached to a rear edge of the seat box body;
   at least one seat tether releasably attaching the seat back to the rear panel strip.

9. The collapsible push car of claim 1, wherein:
   each of the pair of foldable front quarter panels comprises a lock tab positioned to engage with a lock slot in the front chassis body; and
   each of the pair of foldable rear quarter panels comprises a lock top positioned to engage with a lock slot in the rear chassis body.

10. The collapsible push car of claim 1, wherein:
    the front panel strip is hingeably attached to the front chassis body, the front panel strip comprising at least one lock tab positioned to engage with a lock slot in the front chassis body; and
    the rear panel strip is hingeably attached to the rear chassis body, the rear panel strip comprising at least one lock tab positioned to engage with a lock slot in the rear chassis body.

11. The collapsible push car of claim 1, wherein:
an area defined by the front chassis body, the front quarter panels, the front panel strip, and the steering wheel plate is an upper front storage region; and
the push car further comprises a front cover removably attached to upper edges of the front quarter panels, the front panel strip, and the steering wheel plate to cover the upper front storage region.

12. The collapsible push car of claim 1, wherein the seat is built into the rear chassis body.

13. A collapsible push car for holding at least one rider, the push car comprising:
a rigid chassis body comprising a front chassis body and a rear chassis body, the front chassis body and the rear chassis body being a singular, rigid construction;
a front panel strip attached to an edge of the front chassis body distal from the rear chassis body;
a pair of foldable front quarter panels hingeably attached to the front chassis body;
a pair of foldable rear quarter panels hingeably attached to the rear chassis body;
a rear panel strip attached to an edge of the rear chassis body distal from the front chassis body;
a seat positioned on the rear chassis body;
a pair of front wheels attached to the front chassis body;
a pair of back wheels attached to the rear chassis body; and
a handle assembly attached to the rear chassis body, wherein
the front wheels are spaced apart by a first width;
the back wheels are spaced apart by a second width, and
the first width and the second width are not the same.

\* \* \* \* \*